June 6, 1950 J. C. FERGUSON ET AL 2,510,093

STROBOSCOPIC TELEMETERING APPARATUS

Filed Feb. 17, 1947 4 Sheets-Sheet 1

INVENTORS
JOSEPH C. FERGUSON
ALBERT S. HARRIS

BY [signature]

ATTORNEY

INVENTORS
JOSEPH C. FERGUSON
ALBERT S. HARRIS
BY [signature]
ATTORNEY

INVENTORS
JOSEPH C. FERGUSON
ALBERT S. HARRIS
BY
ATTORNEY

INVENTORS
JOSEPH C. FERGUSON
ALBERT S. HARRIS

BY [signature]
ATTORNEY

Patented June 6, 1950

2,510,093

UNITED STATES PATENT OFFICE 2,510,093

STROBOSCOPIC TELEMETERING APPARATUS

Joseph C. Ferguson and Albert S. Harris, Fort Wayne, Ind., assignors, by mesne assignments, to Farnsworth Research Corporation, a corporation of Indiana Application February 17, 1947, Serial No. 728,978

7 Claims. (Cl. 177—380)

This invention relates to electrical telemetering systems and particularly to a system adapted to display the readings or indications of a computer type fuel pump at a remote display station by stroboscopic light sources.

It is conventional practice to provide, at a gasoline station, a fuel pump of the piston type which operates as a volumetric or displacement flow meter. The movements of the piston of the fuel pump are translated into rotations of a suitable number of computer drums to indicate continuously the number of gallons of gasoline dispensed by the pump. Usually three computer drums are provided for indicating the number of gallons in units of one-tenth, one and ten gallons of fuel. It is furthermore customary to provide another set of three computer drums for continuously indicating the price of the volume of gasoline dispensed by the pump in dollars and cents. The computer drums which indicate the price of the gasoline are also made responsive to the piston strokes of the pump by means of computer gears which translate the piston movements into the corresponding price of the volume of gasoline. The computer drums are conventionally provided with a zeroizing mechanism for resetting all the drums to zero after the pump has been stopped and before another dispensing operation of the pump.

For indicating at a remote indicating station or display board the usual information displayed on the conventional housings of fuel pumps, such as the number of gallons of gasoline and their price a telemetering system may be utilized with advantage. A telemetering system of this type must meet certain requirements. The system should be simple, inexpensive, easy to install and service and to maintain in operative condition even by unskilled or semi-skilled personnel. Particularly, it is imperative that such a telemetering system should under no circumstances give false indications when it is operating, but should rather fail to operate if it is not in perfect operating condition.

A mechanical system for transmitting the required information to a remote point will not meet those requirements. One of its chief drawbacks is that it is extremely difficult if not impossible to provide a mechanism for zeroizing the remote display drums between operations of the pump. It is furthermore desirable to provide a telemetering system which will show at the indicating station even small movements of the computer drums to allow the operator to judge when the desired amount of fuel has been pumped.

The mechanical systems which have been proposed heretofore will only cause the remote display drum to jump from one numeral to the succeeding numeral so that it becomes very difficult to judge when the desired number of gallons of fuel has been pumped.

It is the principal object of the present invention, therefore, to provide a novel telemetering system and method for displaying electrically a quantity at a remote indicating station by means of one or more stroboscopic light sources arranged for illuminating a selected character or numeral indicative of the quantity.

Another object of the invention is to provide an electrical telemetering system which cannot give faulty indications when operating and which will not give any indications at a remote display station when it is not in perfect operating condition.

A further object of the invention is to provide an electrical system adapted to display at a remote indicating station the number of gallons of fuel pumped by a fuel pump at a measuring and transmitting station and their total price.

Still a further object of the invention is to provide a telemetering system adapted to display at a remote indicating station the numerals of the computer drums operated at the measuring station by a fuel pump so that even small movements of the drums are displayed which will enable the operator to judge accurately when the desired amount of fuel has been pumped and so that no zeroizing mechanism is required at the display station for resetting the display drums to zero.

Still another object of the invention is to provide, in a telemetering system, a novel remote indicating station for displaying by means of stroboscopic light sources a selected character or numeral indicative of a quantity measured at the measuring and transmitting station.

In accordance with the present invention there is provided a telemetering system comprising a measuring station including a member and means for positioning the member in accordance with a measured quantity. There is further provided, at the measuring station, means cooperating with the member for developing electrical signals. Each signal is developed during one of a plurality of intervals of time so that the occurrence of the signals within each interval of time is indicative of the position of the member during that interval, that is, the signals are indicative of the quantity to be displayed. There is further provided a remote display station which includes an indicator bearing a plurality of characters for displaying the measured quantity and means for moving the indicator through a closed path once during each interval of time. Furthermore there is provided a source of light positioned to illuminate the characters of the indicator. Finally there is provided means for energizing the light source in response to the occurrence of the signals to display the quantity measured at the measuring station.

For a better understanding of the invention, together with other and further objects thereof, reference is made to the following description, taken in connection with the accompanying drawings, and its scope will be pointed out in the appended claims.

Figure 1:
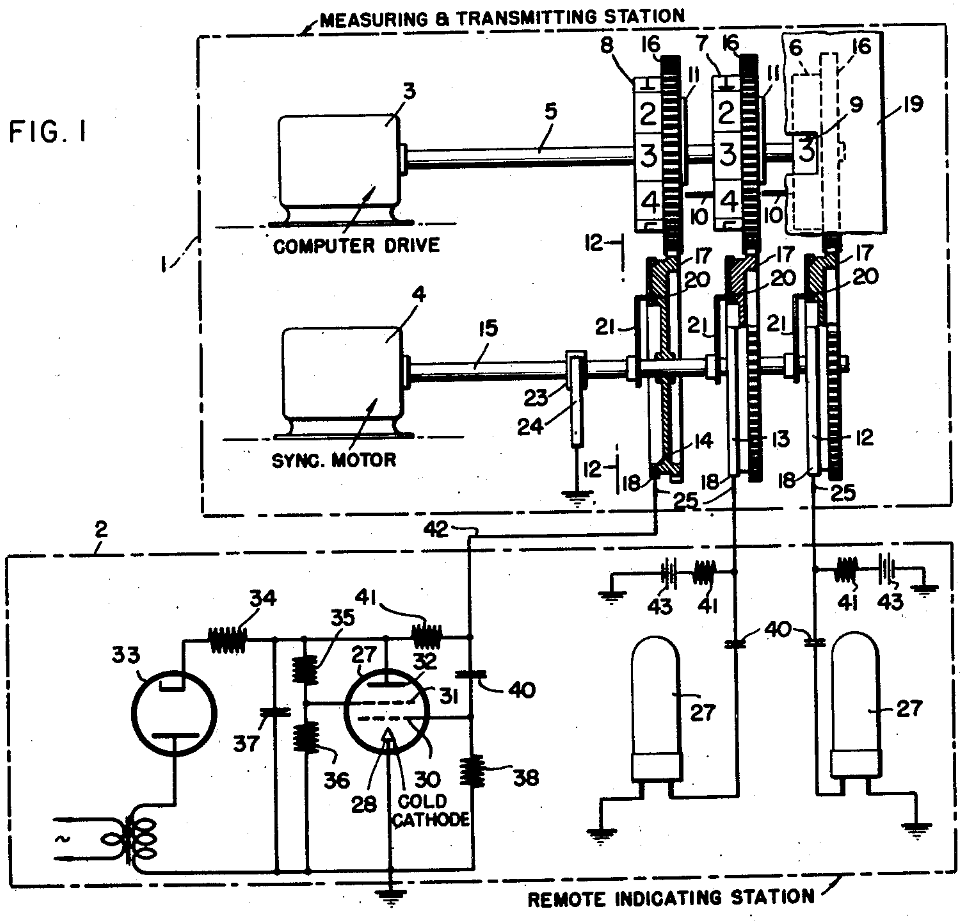
Fig. 1 illustrates an electrical telemetering system in accordance with the instant invention which includes a commutator for developing electrical signals indicative of a quantity to be displayed.

Referring now to the drawings in which like components have been designated by the same reference numerals throughout the figures and particularly to Fig. 1, there is illustrated an electrical telemetering system embodying the present invention and including measuring and transmitting station 1 and remote indicating station 2. Transmitting station 1 comprises a computer drive schematically indicated at 3 and a synchronous motor shown at 4.

Computer drive 3 may include a gasoline pump of the volumetric or displacement type having driving gears for translating the strokes of the piston of the pump into a rotary motion of drive shaft 5 for displaying, for example, the number of gallons of fuel which have been pumped. Alternatively, drive shaft 5 may also be rotated through the intermediary of computer gears by the movements of the piston of the fuel pump to indicate the price in dollars and cents of the number of gallons of fuel dispensed.

It is to be understood, however, that although the telemetering system of the present invention has been illustrated in the drawings as being applicable particularly for indicating the number of gallons and the price of the fuel dispensed by a pump, the system may be used for indicating any quantity to be displayed.

Computer drums 6, 7 and 8 are driven through the intermediary of drive shaft 5 in such a manner that each of the three computer drums is rotated to indicate the measured quantity in units of a particular decimal or decade. Thus, computer drums 6, 7 and 8 may each be provided with the numerals from 0 to 9 inclusive. Computer drum 6 may indicate, for example, the number of gallons in units of one-tenth of a gallon, while computer drums 7 and 8 may indicate the number of gallons in units of one and ten, respectively. To this end computer drum 6 may be fixed to drive shaft 5 while computer drums 7 and 8 may be arranged as idlers. Every time computer drum 6 has been rotated by drive shaft 5 through a full revolution, its pin 10 will engage with Geneva drive 11 (indicated schematically) on computer drum 7, for rotating computer drum 7 through one-tenth of a full revolution to display the next numeral through viewing window 9, in cover 19 which has been partly broken away. Computer drum 7 drives in turn computer drum 8 in the same manner, as is conventional.

In accordance with the present invention commutator rings 12, 13 and 14 are each positioned by computer drums 6, 7 and 8, respectively. By means of each of the three commutator rings an electrical signal is developed once during each of a plurality of intervals of time of equal and fixed duration in such a manner that the occurrence of each pulse within each time interval is indicative of the position of the computer drum associated with the commutator ring, that is, of the quantity to be displayed. In other words the phase of the periodic signals developed indicates the quantity to be displayed. Thus, each signal developed periodically by one of the three commutator rings 12, 13 and 14 is indicative of the number of units of the measured quantity in a selected decade.

Commutator rings 12, 13 and 14 are freely rotatable on synchronous motor drive shaft 15. For positioning, for example, commutator ring 12 there is provided a gear 16 fixed to or integral with computer drum 6. Gear 16 meshes with gear 17 integral with commutator ring 12. Thus, commutator ring 12 is positioned by computer drum 6, that is, its angular position corresponds to that of the drum. Commutator rings 13 and 14 are also positioned through similarly arranged gears 16 and 17 by computer drums 7 and 8, respectively, as clearly shown in Fig. 12. Each commutator structure 12 to 14 is provided on its circumference with an electrically conducting slip ring 18. Each commutator structure 12 to 14 further supports conducting segment 20 on one of its electrically insulating faces, segment 20 being electrically connected with its associated slip ring 18.

Synchronous motor 4 through its drive shaft 15 drives three contactor brushes 21 which are fixed to the shaft and arranged to contact conducting segments 20 on the three commutator rings 12 to 14. Synchronous motor 4 may rotate at a suitable speed such as sixty revolutions per second. Every time drive shaft 15 makes a full revolution, each contactor brush 21 will contact its cooperating conducting segment 20 once. The instant within each interval of 1/60 of a second when each contactor brush 21 contacts its conducting segment 20 will depend upon the position of the commutator ring, that is, upon the position of the associated commutator drum. Drive shaft 15 may be grounded through slip ring 23 fixed to shaft 15 and contactor brush 24 which is connected to ground as indicated.

Whenever one of the contactor brushes 21 contacts its associated conducting segment 20, brush 25 on slip ring 18 will be connected to ground. Thus, an electrical signal may be developed in a circuit connected to each brush 25.

In accordance with the present invention the electrical signals developed whenever a contactor brush 21 contacts its conducting segment 20 is utilized for energizing a stroboscopic light source 27 arranged at remote indicating station 2 for illuminating a particular character or numeral on a remote indicator drum. The particular arrangement of the remote indicator drums and their associated light sources will be explained hereinafter in connection with Figs. 2 and 3. The speed of synchronous motor 4 which determines the frequency of the electrical signals energizing light source 27 should be sufficiently high, such as 60 revolutions per second, to prevent flicker of the display drums at remote indicating station 2.

In Fig. 1 there has been illustrated an electrical circuit for energizing stroboscopic light source 27 through commutator ring 14. Any light source which may be triggered by an electrical signal may be used for the purpose of developing an intense flash of light having a duration of the order of 100 microseconds. A preferred stroboscopic light source is the Strobotron type 1D21 manufactured by Sylvania Electric Products, Inc. Light source 27 as illustrated in Fig. 1 is an internally-triggered, cold cathode, inert-gas-filled electronic tube. Electronic tube or light source 27 is provided with cold cathode 28, control grid 30, shield grid 31 and anode 32. A suitable positive voltage may be developed by low voltage rectifier 33 and supplied to anode 32 through anode resistor 34. Shield grid 31 is supplied with a positive voltage through voltage divider 35, 36 connected between anode resistor 34 and ground. Storage condenser 37 is connected between ground and the positive voltage supply and is discharged through tube 27 whenever the tube is triggered. Control grid 30 is provided with grid leak resistor 38. Condenser 40 is connected between control grid 30 and resistor 41 connected in turn to anode 32. Lead 42 connects the junction point between resistor 41 and condenser 40 to brush 25 cooperating with slip ring 18.

Electronic tube or light source 27 operates as follows. As long as lead 42 is not connected to ground, condensers 37 and 40 are charged through anode resistor 34 from rectifier 33 and control grid 30 is at ground potential. When lead 42 is now connected to ground through slip ring 18, conducting segment 20 and contactor brush 21, condenser 40 is discharged, thereby impressing a negative potential upon control grid 30. This will initiate a glow discharge between grids 30 and 31 consequently to trigger tube 27 and discharge storage condenser 37 through the tube. The thus developed flash of light is sufficient for visual observation and has a duration of the order of 100 microseconds. Light source 27 is accordingly energized whenever contactor brush 21 contacts conducting segment 20.

Commutator rings 13 and 12 have also been shown connected to light sources 27 which are indicated with their circuits schematically. Only two of the four pins of the light sources or tubes are shown. For purposes of illustration, rectifier 33 has been replaced by battery 43 having its negative terminal grounded while the positive terminal is connected through resistor 41 to condenser 40.

It will now be obvious that whenever one of the commutator rings 12, 13 or 14 is connected to ground by its contactor brush 21, its associated light source 27 is energized to develop a flash of light of short duration. These light flashes are utilized at the remote indicating station for displaying a desired numeral in the manner illustrated particularly in Figs. 2 and 3.

Figures 2, 12:
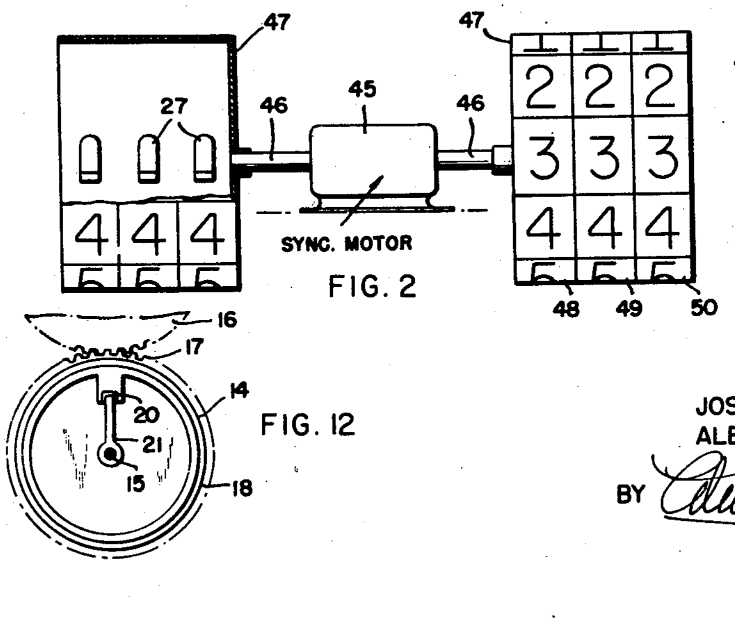
Fig. 2 is a front elevational view of two display drums with their associated light sources forming part of a remote indicating station.
Fig. 12 is a side elevational view taken on line 12—12 of Fig. 1 and illustrating one of the commutator rings and its drive shaft.
Figure 3:
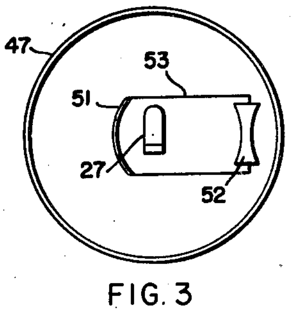
Fig. 3 is a side elevational view of one of the display drums of Fig. 2 with an associated light source for illuminating a particular numeral on the drum.

Figs. 2 and 3 illustrate a preferred remote indicating station which includes synchronous motor 45. Motor 45 is driven at the same rate as is synchronous motor 4 at measuring and transmitting station 1 and is in phase therewith. Synchronous motor 45 may have two drive shafts 46, 46 which are arranged for rotating remote indicator drums 47, 47. Each indicator drum 47 bears three rows 48, 49 and 50 of numerals, each row 48 to 50 containing the numerals from 0 to 9 inclusive. A light source 27 is associated with each of the three rows 48, 49 and 50 of the two indicator drums 47. The six light sources 27 illustrated in Fig. 2 may be identical with the stroboscopic light sources 27 shown in remote indicating station 2 of Fig. 1. As shown in Fig. 3, each light source 27 may have a reflector 51 and a suitable lens 52 arranged in a housing 53 for concentrating and directing the light only through that numeral on indicator drum 47 which is positioned in front of lens 52. Alternatively a window may be provided in front of indicator drum 47 to display only that numeral which is positioned in front of the window.

Commutator rings 12, 13 and 14 at measuring and transmitting station 1 are arranged and positioned by computer drums 6, 7 and 8 in such a manner that those numerals on remote indicator drums 47 will be illuminated by the associated light sources 27 which correspond to the numerals exhibited on computer drums 6, 7 and 8 through window 9 at the transmitting station. If two indicator drums 47 are used as shown in Fig. 2, two transmitters such as shown at 1 in Fig. 1 will be required, one of which may transmit information indicating the number of gallons of fuel while the other may transmit intelligence indicating the price of the pumped volume of fuel.

The telemetering system illustrated in Fig. 1 has the advantage of low initial cost although the wear of slip rings 18 and 23 may increase the replacement cost. It is to be understood, however, that commutator rings 12, 13 and 14 will normally rotate at a very low rate so that the wear of slip rings 18 will be negligible. On the other hand, contactor brushes 21 rotate at a high speed, such as 60 revolutions per second, so that their wear will be considerably greater.

Figures 4, 5:
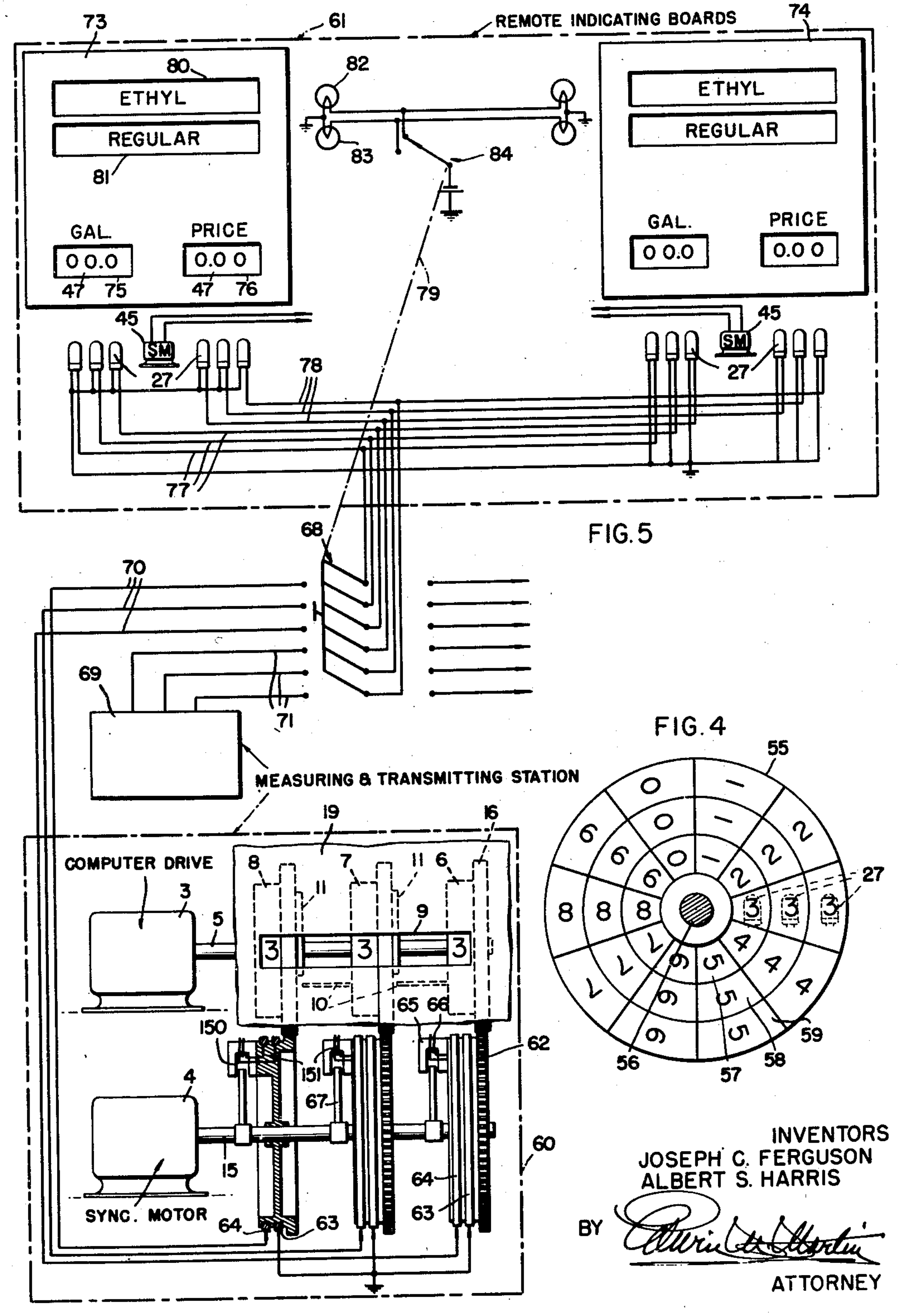
Fig. 4 is a front elevational view of a display disc bearing concentric rows of numerals and their associated light sources forming part of a modified remote indicating station.
Fig. 5 illustrates a preferred telemetering system embodying the present invention and adapted for displaying at two remote indicating boards the number of gallons and the price of the volume of fuel pumped by a fuel pump.

A modified arrangement of the remote indicating station is illustrated in Fig. 4. As shown in Fig. 4, there may be provided disc 55 which may be rotated by drive shaft 56 driven by a synchronous motor such as shown at 45 in Fig. 2. Disc 55 bears three concentric rings 57, 58 and 59 of numerals as illustrated. A stroboscopic light source 27 is arranged to illuminate a particular numeral in each ring in the manner described in connection with Figs. 2 and 3. In view of the fact, that the peripheral speed of disc 55 may become excessive when its diameter becomes too large, the arrangement shown in Figs. 2 and 3 is preferred.

Referring now to Fig. 5, there is illustrated a preferred telemetering system comprising measuring and transmitting station 60 and remote indicating boards 61. At measuring and transmitting station 60 electrical pulses are developed by magnetic induction, the time occurrence of the pulses being indicative of a measured quantity such as the number of gallons of gasoline dispensed by a fuel pump. Transmitting station 60 comprises computer drive 3 which may be identical with computer drive 3 of Fig. 1. Drive shaft 5 positions computer drums 6, 7 and 8 in the manner previously explained. The numerals of computer drums 6, 7 and 8 are exhibited through window 9 in cover 19.

Each computer drum has a drive gear 16 engaging with a gear 62 integral with two slip rings 63 and 64. A magnet 65 which is preferably a permanent magnet is secured to each slip ring 64 and is accordingly positioned by its associated computer drum such as drum 6. The whole assembly including gear 62, slip rings 63, 64 and magnet 65 is mounted to be freely rotatable on drive shaft 15 of synchronous motor 4. Inductive loop 66 is provided on magnet 65 and has one terminal 150 connected to slip ring 63 and the other terminal 151 connected to slip ring 64. A rod 67 of magnetizable material is secured to drive shaft 15 and rotated thereby to induce an electrical impulse in inductive loop 66 whenever rod 67 and magnet 65 pass each other.

Each slip ring 63 may be grounded as shown, while each slip ring 64 may be connected through a lead 70 to double-throw switch 68. Thus, three leads 70 from the three slip rings 64 of the three assemblies of transmitting station 60 are connected to switch 68. Another set of three leads 71 may be connected to another measuring and transmitting station 69 shown schematically which may be similar to station 60. Thus, measuring station 60 may measure the number of gallons, while station 69 connected to leads 71 may measure the price of the volume of fuel dispensed by a pump.

It will now be evident that each magnet 65 is positioned in accordance with the numeral on its associated computer drum such as 6 exhibited through window 9. Magnetizable rod 67 rotates at a constant speed, and therefore, an electrical impulse is developed once during each revolution of synchronous motor 4. The occurrence of this impulse is indicative of the numeral on the associated computer drum exhibited through window 9. These impulses may be utilized as previously explained for energizing a stroboscopic light source to display the particular numeral at remote indicating station or boards 61 which is exhibited at the computer drum.

It is to be understood that rod 67 may alternatively be positioned by the computer drums while each magnet 65 may be rotated by shaft 15 past its associated rod 67 at a constant speed. It is furthermore feasible to replace permanent magnet 65 by an electromagnet which may be energized by a direct current flowing through a suitable winding such as loop 66.

At 61 there are illustrated two remote indicating boards 73 and 74 which are identical. Each indicating board 73 and 74 has two windows 75 and 76 for indicating respectively the number of gallons and the price of the fuel dispensed. The two indicator drums 47 illustrated in Fig. 2 may be disposed behind windows 75 and 76 so that only those numerals are exhibited which are positioned behind windows 75 and 76 when they are illuminated. Indicator drums 47 may be driven by synchronous motors 45. Their associated light sources 27 are shown schematically below indicating boards 73, 74 and are energized through two groups of leads 77 and 78, each consisting of three leads, and a common return lead. The light sources 27 of remote indicating board 74 are connected in parallel with those of indicating board 73.

When switch 68 is turned to the left, all light sources 27 are connected to transmitting station 60 and its associated station 69 for indicating the number of gallons and the price of a certain type of fuel dispensed by the pump. By turning switch 68 to the right, light sources 27 at indicating boards 73 and 74 may be connected to another measuring and transmitting station or stations similar to stations 60 and 69 where a different type of gasoline having a different price is dispensed. Thus, the same remote indicating boards 73 and 74 may be connected to a plurality of different fuel pumps which may dispense different types of gasoline. In order to indicate the type of gasoline which is being pumped, indicating boards 73 and 74 may have other windows such as 80 and 81 bearing on a transparent sheet a legend such, for example, as "Ethyl" or "Regular" indicating the type of fuel. These legends may be illuminated by continuous light sources 82 and 83, respectively, which may be selectively energized through switch 84. Switch 84 may be ganged with switch 68 as indicated at 79 so that either light sources 82 or 83 are energized depending upon the type of fuel dispensed by the fuel pump to which the indicating boards are connected.

Transmitting station 60 will develop a well defined pulse of high amplitude which does not require amplification. The amplitude of the pulse may be controlled by the number of turns of inductive loop 66. The pulses are well defined in shape so that the numerals displayed on indicating boards 73 and 74 will not exhibit any wobble or "jumps." The initial cost of the transmitter is comparatively low, and wear of slip rings 63 and 64 should be very small due to the fact that they rotate at a very low speed. In this embodiment of the invention there are no slip rings which rotate at the high speed of synchronous motor 4.

Figures 6, 11:
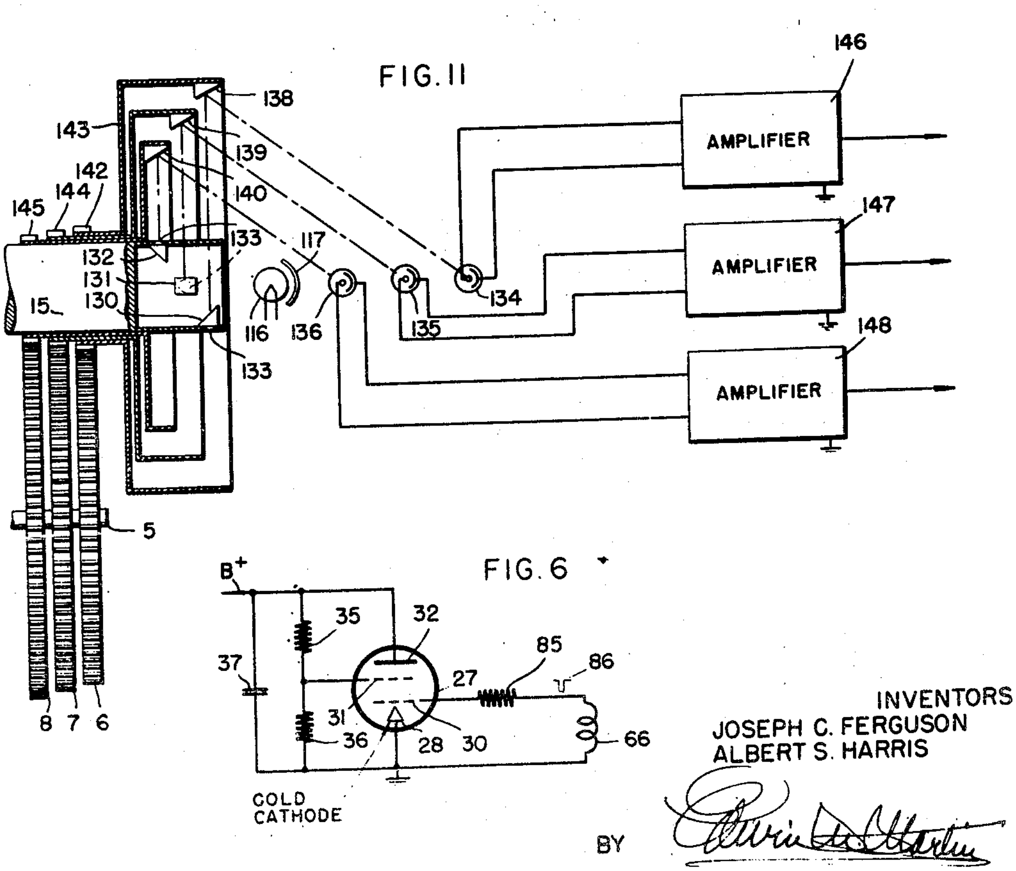
Fig. 6 is an electrical circuit diagram of a stroboscopic light source adapted to be energized by electrical pulses.
Fig. 11 illustrates a transmitting station similar to that shown in Fig. 10 where a plurality of pulses are developed indicative of the number of units of the measured quantity in several decimals or decades.

Transmitting station 60 of Fig. 5 develops electrical pulses which preferably are of negative polarity with respect to ground. The circuit illustrated in Fig. 6 may be utilized for triggering or energizing a light source 27 by these negative pulses. As shown in Fig. 6, light source 27 has its control grid 30 connected to inductive loop 66 through series resistor 85, the inductive loop being connected between control grid 30 and cold cathode 28 which is at ground potential. When a pulse of negative polarity such as shown at 86 is developed in inductive loop 66, the potential of control grid 30 will be depressed, thus initiating a discharge between control grid 30 and shield grid 31 which in turn will discharge storage condenser 37. Otherwise the circuit is arranged and operates in the manner explained in connection with Fig. 1. It is to be understood that light source 27 may also be made responsive to electrical pulses of positive polarity.

Figure 7:
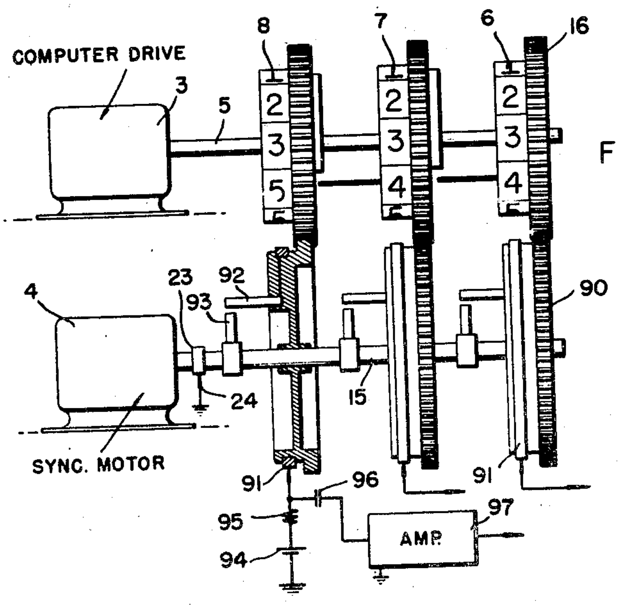
Fig. 7 illustrates a measuring and transmitting station for developing electrical pulses by electrostatic induction, the pulses being indicative of a quantity to be displayed.

In Fig. 7 there is illustrated a modified measuring and transmitting station wherein electrical impulses are developed by electrostatic induction. The transmitting station of Fig. 7 may be connected to a remote indicating station such as illustrated particularly in Figs. 2, 3 and 5. The transmitting station of Fig. 7 comprises a computer drive 3 for positioning computer drums 6, 7 and 8 in the manner already explained. The numerals on computer drums 6, 7 and 8 may be exhibited through a window such as shown at 9 in Figs. 1 and 5. Each computer drum has a drive gear 16 fixed thereto which meshes with a gear 90 integral with slip ring 91. Three assemblies each consisting of a gear 90 and a slip ring 91 are provided for cooperation with the three computer drums 6, 7 and 8. Each gear 90 and slip ring 91 is mounted to freely rotate on drive shaft 15 driven by synchronous motor 4.

Each slip ring bears and has electrically connected thereto a rod 92 of conducting material which is accordingly positioned by its associated computer drum. Three conducting rods 93 are fixed to drive shaft 15 driven by synchronous motor 4 to cooperate with rods 92. Conducting rods 93 are maintained at ground potential which may be effected by grounding drive shaft 15 through slip ring 23 and contactor brush 24 which is grounded. Accordingly, each rod 93 passes its associated rod 92 once during each revolution of drive shaft 15. Each slip ring 91 is connected to an electric circuit, one of which is shown, which comprises a suitable voltage source such as battery 94 having its negative terminal grounded and its positive terminal connected through a resistor 95 to slip ring 91.

Whenever conducting rods 92 and 93 pass each other, the capacitance of the electric circuit connected to slip ring 91 and including condenser 96 is increased, thereby developing an electrical impulse which may be amplified by amplifier 97 which in turn may be connected to a stroboscopic light source such as 27. The occurence of the electrical impulses amplified by amplifier 97 thus depends on the position of conducting rod 92 which is controlled by its associated computer drum. The transmitting station of Fig. 7 accordingly operates in substantially the same manner as transmitting station 60 of Fig. 5 with the exception that the electrical impulses are developed by electrostatic induction instead of by magnetic induction. The transmitter of Fig. 7 has the advantage that only one slip ring 91 is required for each assembly, and wear of the slip rings should be very small.

Figures 8, 9:
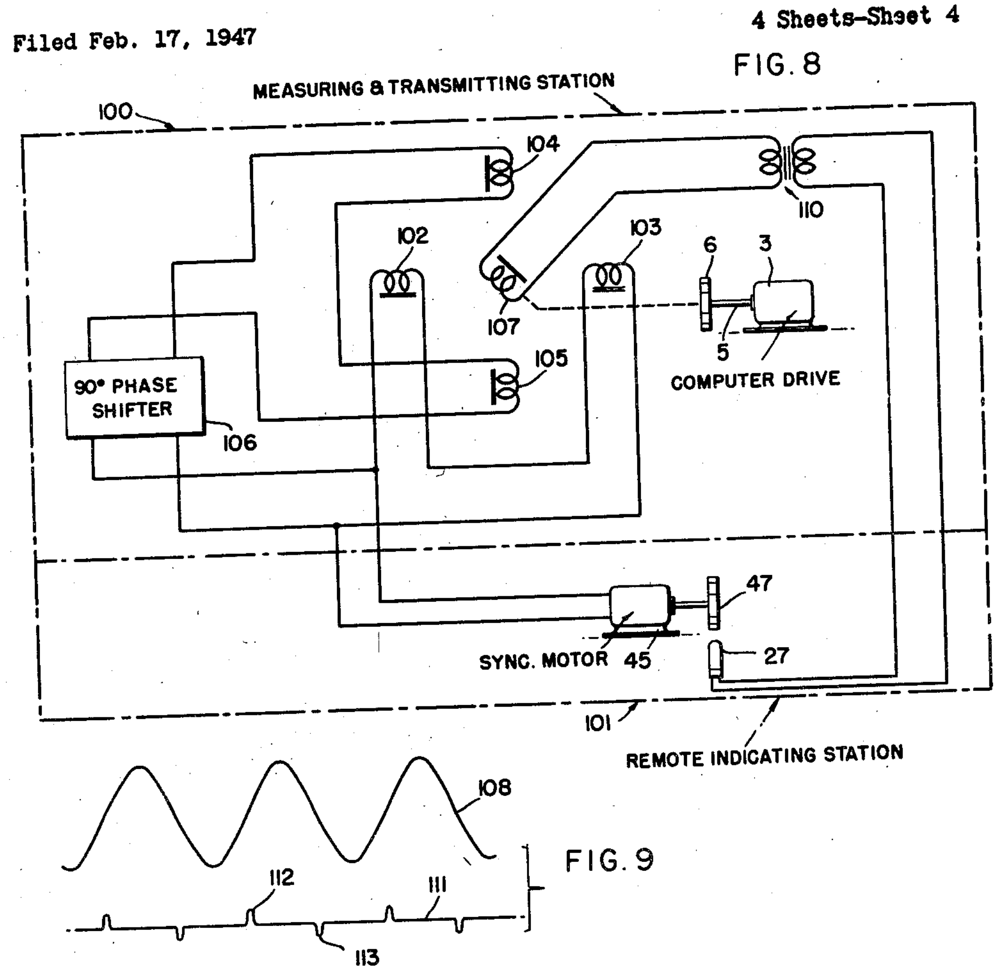
Fig. 8 illustrates a modified measuring and transmitting station with its remote indicating station where the phase of a sinusoidal wave is controlled at the transmitting station in accordance with a quantity to be displayed.
Fig. 9 is a graph of the sinusoidal wave developed at the transmitting station of Fig. 8 and of pulses derived from the wave and having a time occurrence indicative of the quantity measured.

Referring now to Fig. 8, there is illustrated a further embodiment of an electrical telemetering system embodying the present invention wherein the phase of a sinusoidal wave is controlled in accordance with a quantity to be indicated. The system of Fig. 8 comprises measuring and transmitting station 100 and remote indicating station 101. Transmitting station 100 includes inductance elements 102, 103 and 104, 105. Inductance elements 102 to 105 are fed by a sinusoidal wave which preferably is obtained from synchronous motor 45 at remote indicating station 101 as shown. Inductance elements 102 and 103 are connected in series to the alternating current supply obtained from synchronous motor 45, while inductance elements 104, 105 are fed in series through 90 degrees phase shifter 106 connected to the current supply.

Accordingly, the sinusoidal waves flowing through inductance elements 102 and 103 are 90 degrees out of phase with respect to the wave flowing through inductance elements 104 and 105. Consequently a rotating electromagnetic field is developed between inductance elements 102 to 105 which rotates at the frequency of the sinusoidal input wave which may be 60 cycles per second. Inductance loop 107 is movably arranged in the rotating electromagnetic field developed by inductance elements 102 to 105. Inductance loop 107 is positioned by computer drive 3 through its drive shaft 5 and computer drum 6. If more than one computer drum 6 is required, each drum may be arranged to position an inductance loop such as 107. A common electromagnetic field for all inductance loops 107 may be provided by inductance elements 102 to 105.

A sinusoidal wave such as illustrated at 108 in Fig. 9 is induced in inductance loop 107, and its phase depends upon the angular position of inductance loop 107 and is accordingly indicative of the position of computer drum 6. Sinusoidal wave 108 may now be utilized for energizing light source 27 at remote indicating station 101 in accordance with the position of computer drum 6.

Preferably pulses are derived from sinusoidal wave 108 for energizing thereby the stroboscopic light source. For this purpose there may be provided saturated differentiating transformer 110 connected to inductance loop 107. The output of transformer 110 derived from sinusoidal wave 108 is illustrated at 111 in Fig. 9 and includes positive impulses 112 and negative impulses 113. As previously explained in connection with Fig. 6, light source 27 may be responsive to negative impulses 113. The time occurence of pulses 113 is dependent upon the phase of sinusoidal wave 108, that is, it is indicative of the position of computer drum 6.

At remote indicating station 101 light source 27 is arranged for illumnating indicator drum 47 bearing the numerals from 0 to 9 which in turn is driven by synchronous motor 45.

Saturated differentiating transformer 110 may either be provided at transmitting station 100, as illustrated, or at indicating station 101. Sometimes it may be preferred to transmit to the remote indicating station a sinusoidal wave rather than pulses, and in that case transformer 110 may be provided in indicating station 101. It is also feasible to combine transformer 110 with inductance loop 107 which then should be a saturated coil.

The telemetering system of Fig. 8 has the advantage that no moving parts need be provided at transmitting station 100 except inductance loop 107 which is rotated very slowly. Since no slip rings are required, there will be no mechanical wear. Furthermore no synchronous motor is required at transmitting station 100.

The voltage wave induced in inductance loop 107 will not be so smooth as desired for some applications so that a certain amount of wobble or "jump" of the numerals at indicating station 101 may be expected.

If inductance elements 102 to 105 were connected directly to the power line, transient phase shifts of the voltage in the power line would cause a rapid shift of the phase of the rotating electromagnetic field developed by inductance elements 102 to 105. On the other hand, synchronous motor 45 due to its mechanical inertia will not be able to follow these phase shifts as rapidly as does the electromagnetic field so that transmitter 100 and indicator 101 may fall out of step. It is therefore preferred to obtain the alternating current flowing through inductance elements 102 to 105 from synchronous motor 45 as illustrated.

Figure 10:
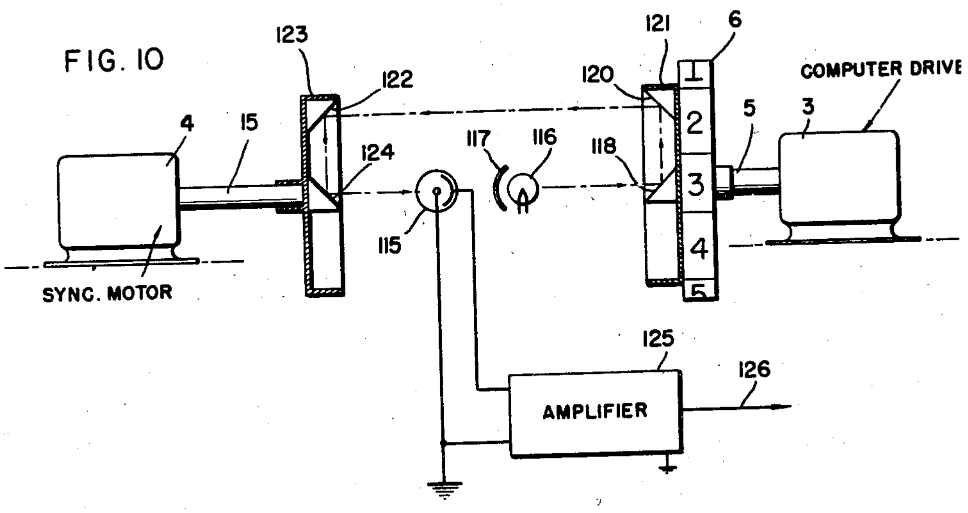
Fig. 10 illustrates another measuring and transmitting station embodying the instant invention where a light beam is reflected into a photoelectric cell for developing pulses utilized for controlling the light source at a remote indicating station.

Referring now to Fig. 10, there is illustrated a further embodiment of a measuring and transmitting station in accordance with the instant invention. The transmitting station of Fig. 10 comprises a photoelectric cell 115 and means for reflecting a light beam into cell 115 once during each of a plurality of intervals of time of predetermined and fixed duration. The light beam is developed by a steady light source 116 having a suitable reflector 117 for directing the light onto mirror 118. Mirror 118 is mounted or fixed to computer drum 6 which may be driven by computer drive 3 through drive shaft 5. Mirror 120 is mounted on an outer rim 121 which is also fixed to computer drum 6. Mirror 120 is positioned by computer drum 6 to reflect the light beam from light source 116 onto mirror 122 mounted on a rim 123 which in turn is driven by synchronous motor 4 through drive shaft 15. Mirror 122 is rotated at a predetermined speed such as 60 revolutions per second.

Every time mirror 122 passes opposite mirror 120, the light beam is reflected onto mirror 124 which in turn reflects the light beam into photoelectric cell 115 to develop a signal. Photoelectric cell 115 is connected to amplifier 125 through a suitable current source and resistor for developing a pulse which is then amplified and which may be obtained from output lead 126. Output lead 126 may be connected to stroboscopic light source 27 at a remote indicating station in the manner explained, for example, in connection with Fig. 5.

The time within each full revolution of drive shaft 15 when the light beam is reflected into photoelectric cell 115 is determined by the position of mirror 120. Thus, the time occurrence of each pulse is indicative of the position at computer drum 6 and therefore of the quantity to be displayed. Mirrors 118, 120, 122 and 124 may be replaced by totally reflecting prisms.

If more than one computer drum such as 6 is provided, each computer drum may be associated with a transmitter such as illustrated in Fig. 10. However, it may be preferred in such a case to utilize the transmitter of Fig. 11. In the transmitter of Fig. 11 an electrical impulse is developed whenever a light beam is reflected into a photoelectric cell. The arrangement is such that only one light beam is required which may be reflected into a plurality of photoelectric cells.

Steady light source 116 is disposed to direct a light beam into drive shaft 15 which may be driven by a synchronous motor such as 4 and which is hollow as illustrated. Drive shaft 15 is provided with three totally reflecting prisms 130, 131 and 132 upon each of which the light beam from light source 116 impinges constantly. Each prism is arranged adjacent a suitable aperture 133 in drive shaft 15 so that three light beams are continuously reflected away from and at right angles to drive shaft 15. These three light beams are periodically reflected into photoelectric cells 134, 135 and 136.

To this end mirrors 138, 139 and 140 are provided which are positioned by computer drums 6, 7 and 8 illustrated schematically. Computer drum 6 which has been shown as a gear engages with gear ring 142 integral with bracket 143 which in turn bears mirror 138. Thus, mirror 138 is positioned by computer drum 6. Mirrors 139 and 140 are positioned in a similar manner by gear rings 144 and 145 engaging with the gears of computer drums 7 and 8.

Each mirror 138, 139 and 140 is accordingly positioned by its associated computer drums 6, 7 and 8, respectively. During each full revolution of drive shaft 15, a light beam is reflected once into each photoelectric cell 134, 135 and 136 to develop an electrical pulse which may be amplified by amplifiers 146, 147 and 148, respectively. The output of amplifiers 146 to 148 may be connected individually to stroboscopic light sources 27 in the manner explained, for example, in connection with Fig. 5.

The transmitting systems illustrated in Figs. 10 and 11 have the advantage that neither slip rings nor electric commutators are required so that the maintenance problem of such slip rings due to their wear is eliminated. The pulses developed by either photoelectric cell 115 or by cells 134, 135 and 136 are well defined in shape, and their time occurrence can be very closely controlled.

The electrical telemetering system of the present invention cannot give false indications at the remote indicating station as long as the system is operating. If the system is not in perfect operation, no indications will be obtained at the remote indicating station. The operation of the system can be very easily checked. Thus, when the telemetering system is operating and when all computer drums such as 6, 7, and 8 are at 0 as seen through window 9, the indications obtained at the remote indicating station can be checked. Excessive wobble of the numerals displayed at the indicating station will show that the system is not operating properly.

It is not necessary to reset the remote indicating drums such as 47 to zero by any mechanical means because the indications of the remote indicating drums will always correspond to those at the transmitting station. Thus, all that is necessary is to provide a conventional zeroizing mechanism for the computer drums such as 6, 7 and 8 at the transmitting station which will automatically reset the remote indicator drums to zero at the remote station. Even small movements of the computer drums at the transmitting station will be clearly shown at the remote indicating station. Thus, the numerals exhibited on the remote indicating drums will not jump suddenly, but will move slowly from one position to the next in the same manner as the mechanically operated computer drums of the transmitting station. This will allow the operator to judge accurately when the desired amount of gasoline has been dispensed so that the pump may be shut off at the right moment.

While there has been described what are at present considered the preferred embodiments of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In a telemetering system, a measuring station including means for developing a light beam, a first and a second light reflecting member, means for positioning said first member in accordance with a measured quantity to reflect said beam into the path of said second member, a photoelectric cell, means for moving said second member through a closed path once during each of a plurality of periodically recurring intervals of time of fixed duration to reflect said beam from said first member into said cell, and means associated with said cell for developing an electrical pulse whenever said beam is reflected into said cell, the occurrence of said pulses being indicative of said quantity.

2. A telemetering system comprising a measuring station including means for developing a light beam, a first and a second light reflecting member, means for positioning said first member in accordance with a measured quantity to reflect said beam into the path of said second member, a photoelectric cell, means for rotating said second member at a constant rate once during each of a plurality of periodically recurring intervals of time to reflect said beam from said first member into said cell, means associated with said cell for developing an electrical pulse whenever said beam is reflected into said cell and the occurrence of said pulses being indicative of said quantity.

3. A telemetering system comprising a measuring station including means for developing a light beam, a first and a second light reflecting member, a photoelectric cell, means for rotating said first member to an angular position indicative of a measured quantity to reflect said beam into the path of said second member, means for rotating said second member once through a full revolution in each of a plurality periodically recurring intervals of time of fixed duration to reflect said beam once during each interval from said first member into said cell, and means coupled to said cell for developing an electrical pulse whenever said beam is reflected into said cell.

4. In a telemetering system, a light beam source, a photoelectric cell, a pair of members, one being movable at a given rate of speed cyclically with respect to the other, a light reflector carried by each of said members, the reflector carried by one of said members being maintained in reflecting relation with respect to said beam and the reflector carried by the other of said members being maintained in reflecting relation with respect to said cell, and the reflectors being brought into reflecting relation with respect to each other at least once during each of said cyclic movements to effect momentarily reflection of said beam to said cell.

5. In a telemetering system according to claim 4, wherein each of said members is mounted for rotation about a common axis, and the reflectors carried thereby are disposed at a distance from said axis.

6. In a telemetering system according to claim 4, wherein said members are disposed for movement about a common axis and the reflectors carried by said members are disposed at different distances radially of said axis.

7. In a telemetering system, a light beam source, a plurality of photoelectric cells, a plurality of members mounted for movement about a common axis, one of said members being movable at a given rate of speed cyclically with respect to the others, said one member having means for directing light from said source in the form of beams toward the other of said members, each of said other members carrying a reflector adapted to reflect one of said beams of light momentarily during each of said cyclic movements and the reflectors carried by said other members being maintained in reflecting relation with respect to a corresponding one of said cells for momentary reflection of said beam to such cell.

JOSEPH C. FERGUSON.
ALBERT S. HARRIS.

REFERENCES CITED

The following references are of record in the file of this patent:

UNITED STATES PATENTS

| Number | Name | Date |
|---|---|---|
| 1,620,405 | Sprenger | Mar. 8, 1927 |
| 1,775,368 | Methlin | Sept. 9, 1930 |
| 1,933,650 | Bascom | Nov. 7, 1933 |
| 2,125,491 | Dean | Aug. 2, 1938 |
| 2,184,355 | Libman | Dec. 26, 1939 |
| 2,203,995 | Main | June 11, 1940 |
| 2,225,363 | Ziegenbein | Dec. 17, 1940 |
| 2,321,971 | Becker | June 15, 1943 |
| 2,394,196 | Morgan | Feb. 5, 1946 |
| 2,403,890 | Johnson | July 9, 1946 |
| 2,406,858 | Shepherd | Sept. 3, 1946 |
| 2,407,286 | Kinkead | Sept. 10, 1946 |
| 2,429,259 | Bugg | Oct. 21, 1947 |

FOREIGN PATENTS

| Number | Country | Date |
|---|---|---|
| 584,954 | Germany | Sept. 27, 1933 |